April 25, 1961 C. H. CROSBY ET AL 2,981,049
APPARATUS FOR MAKING MULTI-UNIT CABLE
Filed July 13, 1959 5 Sheets-Sheet 3

INVENTORS
C.H.CROSBY
W.T.HICKS
A.C.NYSTROM
R.R.WAHLBERG
ATTORNEY

April 25, 1961 C. H. CROSBY ET AL 2,981,049
APPARATUS FOR MAKING MULTI-UNIT CABLE
Filed July 13, 1959 5 Sheets-Sheet 4

INVENTORS
C.H.CROSBY
W.T.HICKS
A.C.NYSTROM
R.R.WAHLBERG
By
ATTORNEY

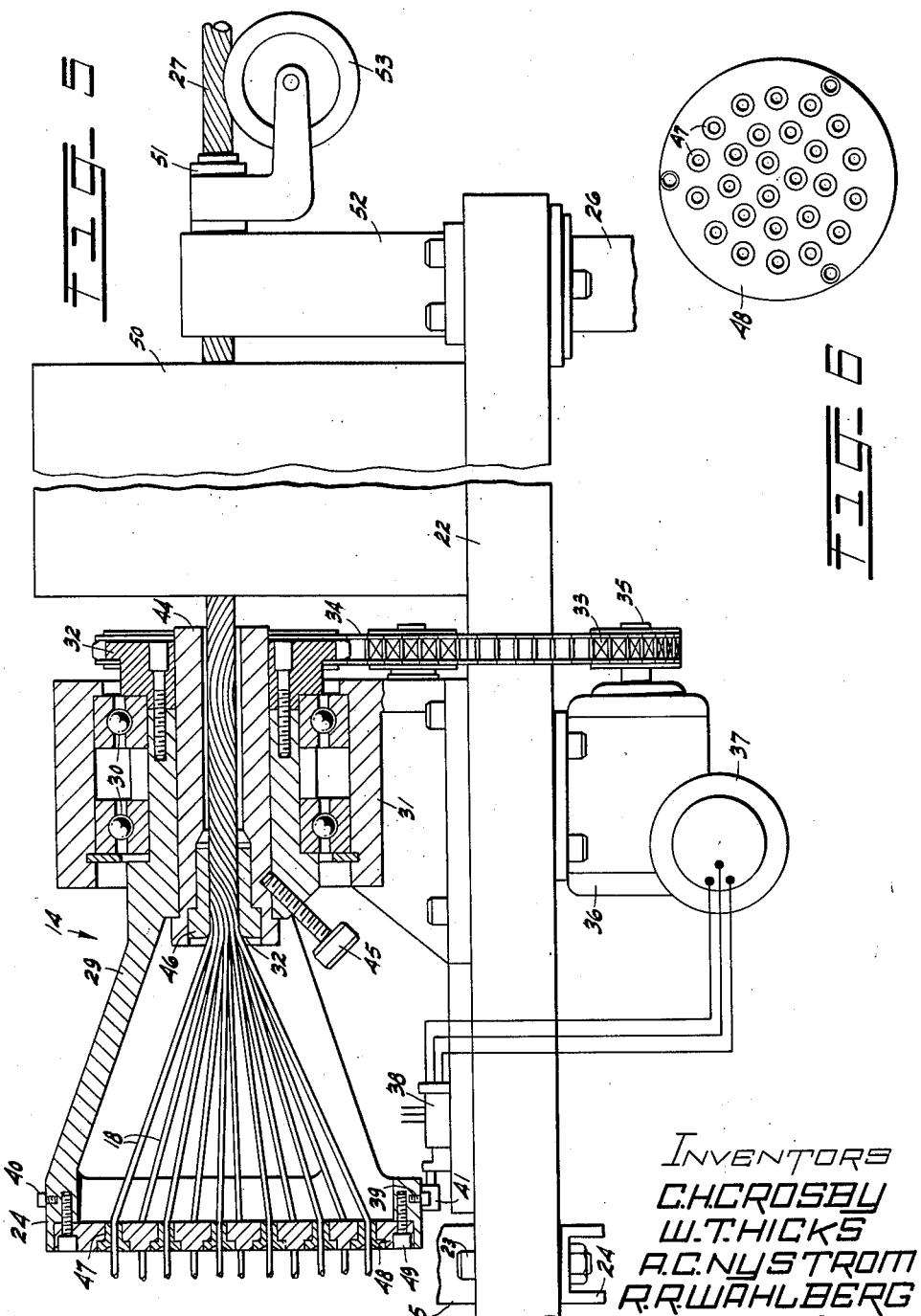

United States Patent Office 2,981,049
Patented Apr. 25, 1961

2,981,049

APPARATUS FOR MAKING MULTI-UNIT CABLE

Charles H. Crosby, Cranford, William T. Hicks, Glen Rock, Axel C. Nystrom, Rutherford, and Roger R. Wahlberg, Bloomfield, N.J., assignors to Western Electric Company, Incorporated, New York, N.Y., a corporation of New York Filed July 13, 1959, Ser. No. 826,717

5 Claims. (Cl. 57—66.5)

This invention relates to apparatus for manufacturing cables particularly multi-unit cables of various sizes.

In the telephone industry, cable of various sizes are required and, to satisfy this need, it has been found highly advantageous to provide a method and means whereby the cable of various sizes may be manufactured with a minimum amount of variations in the apparatus. Furthermore, the compactness of such structures without loss of efficiency greatly reduces not only the manufacturing area for the cables of various sizes, but greatly reduces the set-up and threading periods as well as the number of personnel usually required for such machines.

The object of the present invention is an apparatus for efficiently stranding cables of various sizes.

In accordance with the object, the invention comprises an apparatus which includes numerous closely positioned supply stands each having four rows of supply reels for producing four groups of strands advanced longitudinally, by one of several driven take-up reels of take-up units, through cable unit twisting and binding units and through cable core binding units for each take-up unit. The twisting or oscillating heads for each group of strands include a face plate with guides for the strands and a reversible motor so that all of the oscillating units are driven individually to create random lay of the strands in each cable unit. Furthermore, the oscillating units and their respective binding heads are pivotally supported adjacent their supply stands to direct their cable units selectively to the core binding units to produce cables of various sizes.

Figure 1:
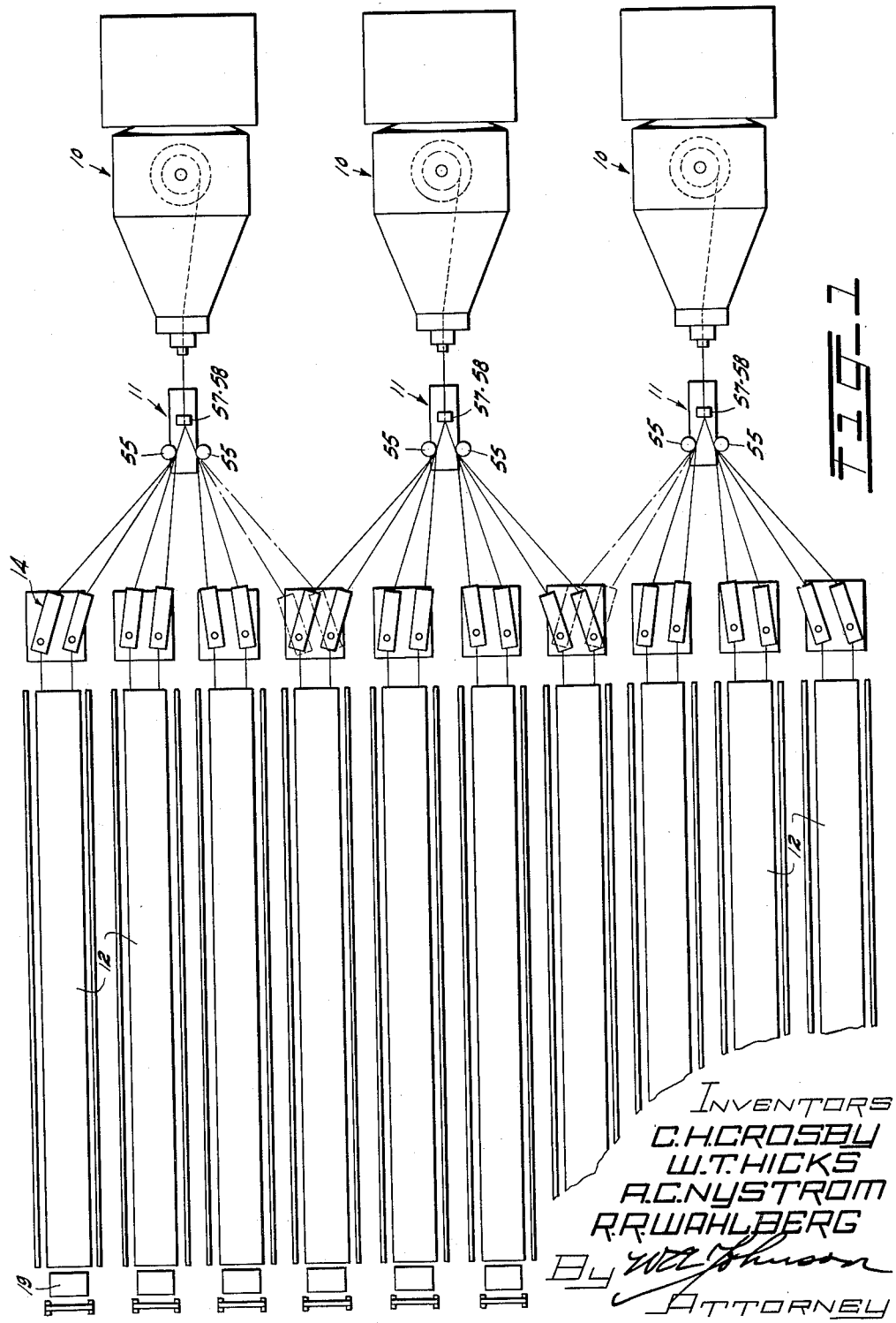
Figure 2:
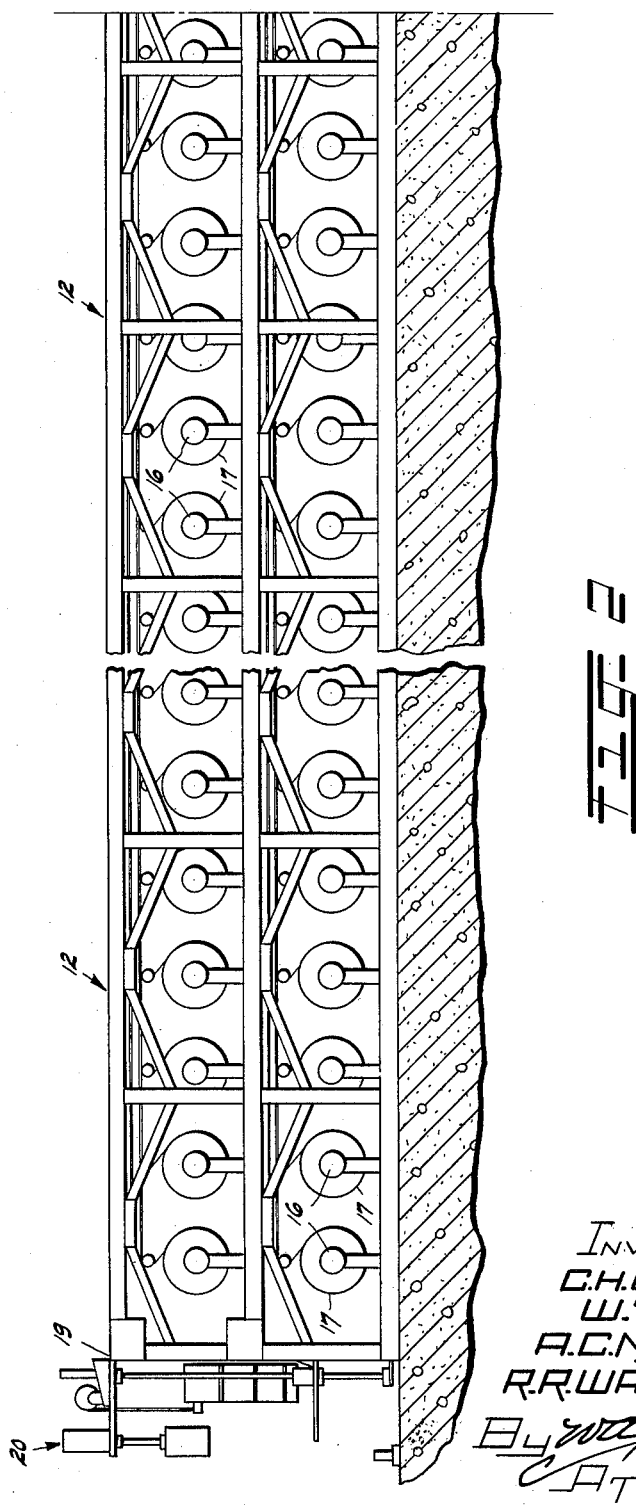
Figure 3:
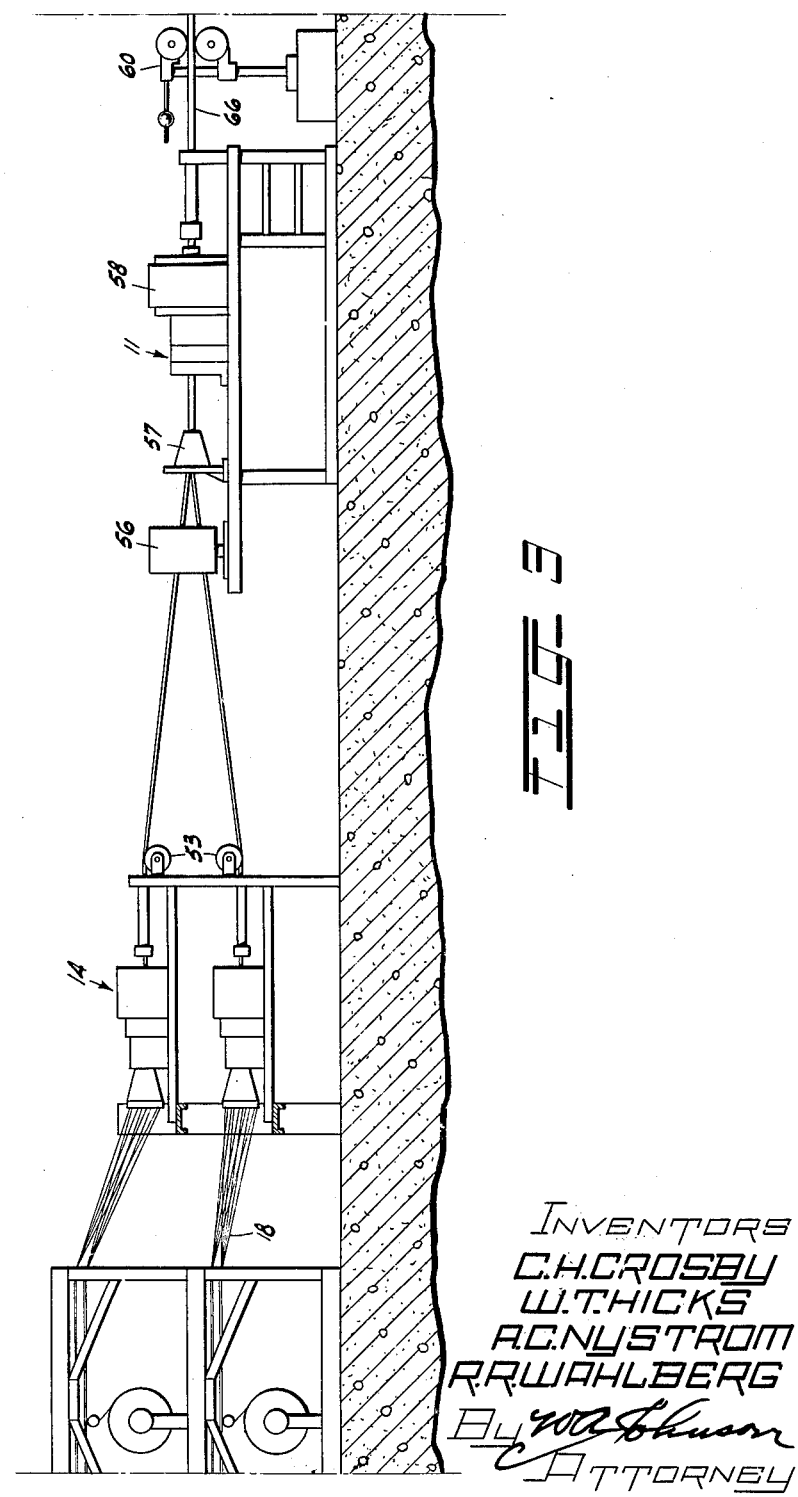
Figure 4:
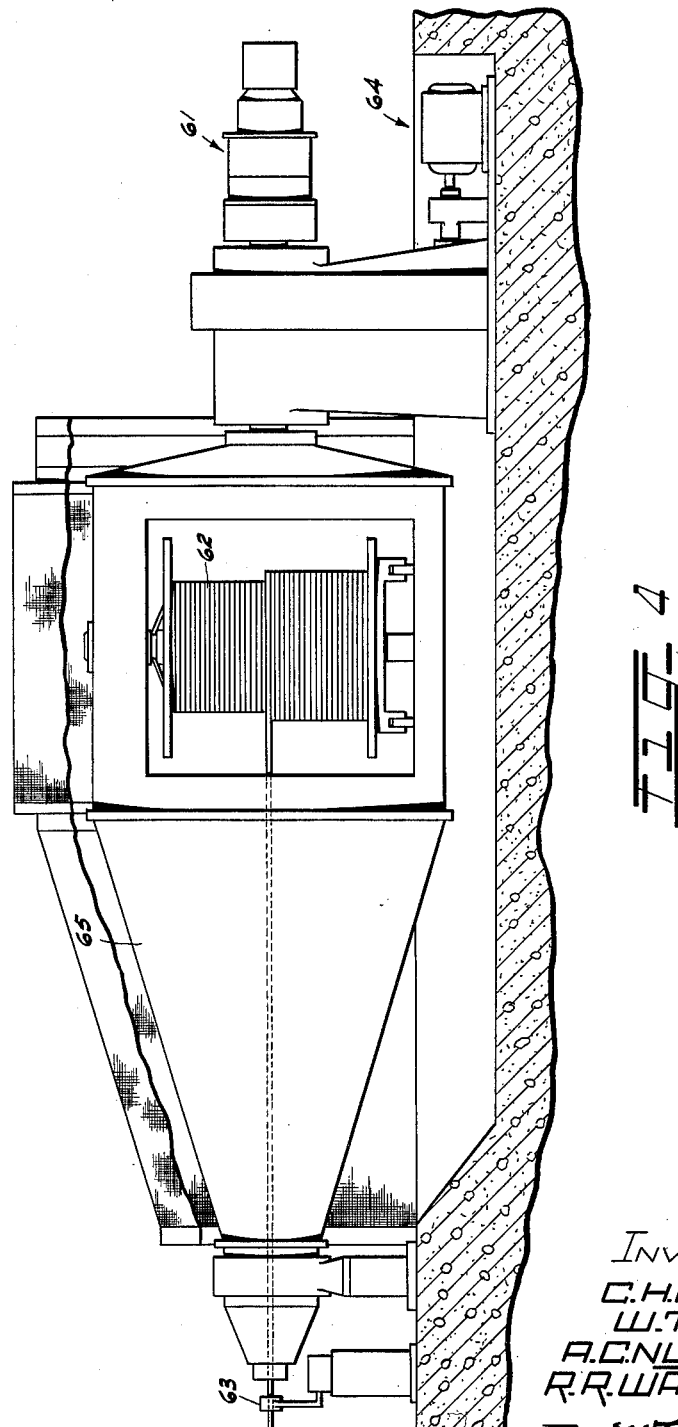

Other objects and advantages will be apparent from the following detailed description when considered in conjunction with the accompanying drawings wherein:

Fig. 1 is a schematic top plan view of the apparatus;

Figs. 2, 3, and 4, when placed in alignment numerically, illustrate a side elevational view more in detail of the apparatus;

Fig. 5 is a fragmentary side elevational view of one of the oscillating units and its associated structure, portions thereof being shown in section; and Fig. 6 is a front elevational view of one of the face plates for one of the oscillating units.

The apparatus, as shown in Fig. 1, has three take-up units indicated generally at 10, three core binding units indicated generally at 11, ten supply stands 12, and 40 oscillating heads and unit binders indicated generally at 14. With this arrangement of units, cables of various sizes may be formed in a minimum work area with the least amount of set-up time.

Attention is now directed to Figs. 2, 3, and 4. Beginning with Fig. 2, the ten supply stands 12 each have four rows of reel supporting units 16, two lower and two upper rows, each row holding, in the present instance, 27 supply reels 17 of single or pairs of strands 18. The supply stands may be mounted close to each other, as illustrated in Fig. 1, for the reason that, although the threading operation is performed at the side, the reels are all loaded and unloaded from entrance ends 19 by an elevator mechanism indicated generally at 20, which is the subject matter of a co-pending application of Crosby-Dzugan-Hicks-Wahlberg, Serial No. 810,620, filed May 4, 1959. Furthermore, the strands 18 are threaded through the different areas of each supply stand by wire guides shown in the co-pending Crosby-Hicks-Wahlberg application, Serial No. 798,172, filed March 9, 1959.

Fig. 5 shows more in detail one of the 40 oscillating heads 14. The oscillating heads are identical in structure and the description of the one shown in Fig. 5 will apply to all of the oscillating heads. This oscillating head has a lateral support 22 having one end pivotally mounted at 23 on an angle member 24 of a stationary frame 25, while the other end is supported by leg 26 which may be moved to move the support 22 about the pivot 23 to direct the cable unit 27 toward one or another of the adjacent core binding units 11. The oscillating unit 14 includes a main member 29 of the contour shown having a reduced end mounted in bearings 30 supported in a bracket 31.

A sprocket 32 is fixed to the reduced end of the member 29 concentric with the axis of this member and is operatively connected to a sprocket 33 by a chain 34. The sprocket 33 is mounted on a shaft 35 which is the output shaft of a speed reducing unit 36 driven by a motor 37. The motor 37 is under the control of a reversible switch 38 to cause oscillation of the main member 29 in reverse directions determined by projections 39 and 40 mounted on the member 29 and positioned to engage an actuable portion 41 of the switch 38. The member 29 has a sleeve 44 extending therethrough and removably locked in place by a screw 45. The sleeve 44 supports a die 46 for compressing the strands 18 into the unit 27.

The strands or pairs of strands are initially threaded through guide bushings 47 in a face plate 48 which is removably secured at 49 in the end of the member 29. A front view of the face plate 48 with its bushings 47 is shown in Fig. 6. Fig. 5 has a conventional unit binder disposed in the area represented by the box-like member 50 to bind the strands together in forming the unit 27.

Another guide 51 supported by a bracket 52 is apertured for the cable unit 27 and supports a grooved roller 53 for the cable unit leaving this area and being directed to its respective core binder 11. The various structures, 40 in number as shown in Fig. 5, may, individually or in groups of two or four for each supply stand, be directed toward selected core binder units 11.

After the cores leave their respective rollers 53, the selected groups thereof are advancing between guide rollers 55 of units 56 through forming dies 57 and core binders 58. Here the cable units are bound together to form cores of selected variable sizes. After leaving the core binding unit 58 in each instance, the core is passed through a synchronizing unit 60 which tends to control the speed of the drive means indicated generally at 61 for driving the core truck 62 in each take-up unit.

A snubber unit 63, which is the subject matter of the co-pending application Crosby-Hicks-Wahl-Wahlberg, Serial No. 798,120, filed March 9, 1959, operates in conjunction with the driving means indicated generally at 64 for a cradle 65 of each take-up unit so that the moment the drive means 61 and 64 are de-energized to stop the take-up unit in each instance, the snubber unit 63 will grip the core 66 and hold it against rearward motion, such as when the cable core is cut. The snubber unit 63 is adapted through means, not shown, but disclosed in said co-pending application to release its gripping action on the cable core when forward motion of the cable core is renewed.

Operation

The supply stands 12 when loaded with supply reels are in readiness for the selection of any or all of their four groups of strands, in each instance, to complete simultaneously in the structure shown in Fig. 1, the formation of cables of like or varied sizes. This is accomplished through the swinging supporting action of the units 14 including the oscillating heads and binding units shown in Fig. 5.

In the present illustration of Fig. 1, the groups of strands from the four central supply stands are directed to the central unit 11 while the groups from the outer three supply stands are directed to the outer units 11. It is also illustrated by broken lines how the cable units from the oscillating and binding units 14, referred to as the fourth group in each end, may be directed to the outer units instead of the inner or central unit 11. Numerous other arrangements may be carried out using one or more of the groups of units 14 for each unit 11 or portions thereof, depending upon the requirement in each instance for the numbers of strands or cable units for each cable core.

Regardless of the sizes of the cables formed, they may be formed simultaneously or individually, as not only is the size of the cable in each instance a determining factor, but also the length of each cable. The cables of various sizes are made of lengths which vary according to orders or specified requirements. With advance knowledge of the different sizes and cables needed to fill the orders, the different groups of units may be utilized in the best manner possible to satisfy these needs.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for manufacturing cables comprising a plurality of supply stands having parallel rows of supporting units for strand supply reels, spaced take-up units including core trucks driven about their axes to take-up thereon cable cores formed of groups of the strands and rotated about axes at right angles to the core truck axes to put twists in the cables, core binders mounted in advance of the take-up units to bind cable units formed of the strands into the cable cores, unit binders for the groups of strands of their respective rows of supply reels, and means to rockably support the unit binders for direction of their cable units in like and varied numbers to the core binders for stranding cable units and forming cable cores of like and variable sizes thereof simultaneously.

2. An apparatus according to claim 1 in which the rockably supported unit binders have rotatable apertured face plates for their groups of strands, and individual reversible drive means for the face plates to create random lay of twisted strands in the cable units.

3. An apparatus for manufacturing cables comprising a plurality of supply stands disposed adjacent each other and having parallel rows of supporting units for strand supply reels, unit binders to receive the groups of strands from the rows of supply reels and bind them into cable units, core binders spaced from each other and the unit binders operable to bind selected groups of the cable units together to form cables, take-up units for the cables to advance the cables, the cable units and the strands, and rockable supports for the unit binders so that like and varied numbers of the unit binders may direct their cable units to the core binders to form cable cores of like and varied sizes simultaneously.

4. An apparatus according to claim 3 in which apertured face plates for the strands in the groups are rotatably mounted in advance of the unit binders, and individual drive means for the face plates to rotate them periodically in reverse directions to create random lays in the strands of the cable units.

5. An apparatus according to claim 3 in which cables of various lengths may be cut adjacent the take-up units when the take-up units are stopped, and snubbers mounted adjacent the core binders and actuable to grip the cables when the take-up units are stopped to hold the cut cable, the cable units and the strands under tension.

References Cited in the file of this patent

UNITED STATES PATENTS

| | | |
|---|---|---|
| 1,422,073 | Anderson | July 11, 1922 |
| 1,495,144 | Anderson | May 27, 1924 |
| 1,990,071 | Green et al. | Feb. 5, 1935 |
| 1,992,707 | Lloyd | Feb. 26, 1935 |
| 2,360,783 | MacCreadie | Oct. 17, 1944 |
| 2,780,906 | Fewtrell et al. | Feb. 12, 1957 |
| 2,924,930 | Crosby | Feb. 16, 1960 |